(No Model.)  12 Sheets—Sheet 3.

R. BIRKHOLZ.
STAVE MAKING MACHINE.

No. 585,178.  Patented June 29, 1897.

Witnesses:
Geo. W. Loung.
Chas. L. Goss.

Inventor:
Richard Birkholz,
By Dickler Sondern Smith Potterm Weben
Attorneys.

(No Model.) 12 Sheets—Sheet 5.
R. BIRKHOLZ.
STAVE MAKING MACHINE.

No. 585,178. Patented June 29, 1897.

Witnesses
Geo. W. Irving,
Chas. L. Goss.

Inventor:
Richard Birkholz,
By his Attorneys.

(No Model.) 12 Sheets—Sheet 6.
R. BIRKHOLZ.
STAVE MAKING MACHINE.
No. 585,178. Patented June 29, 1897.
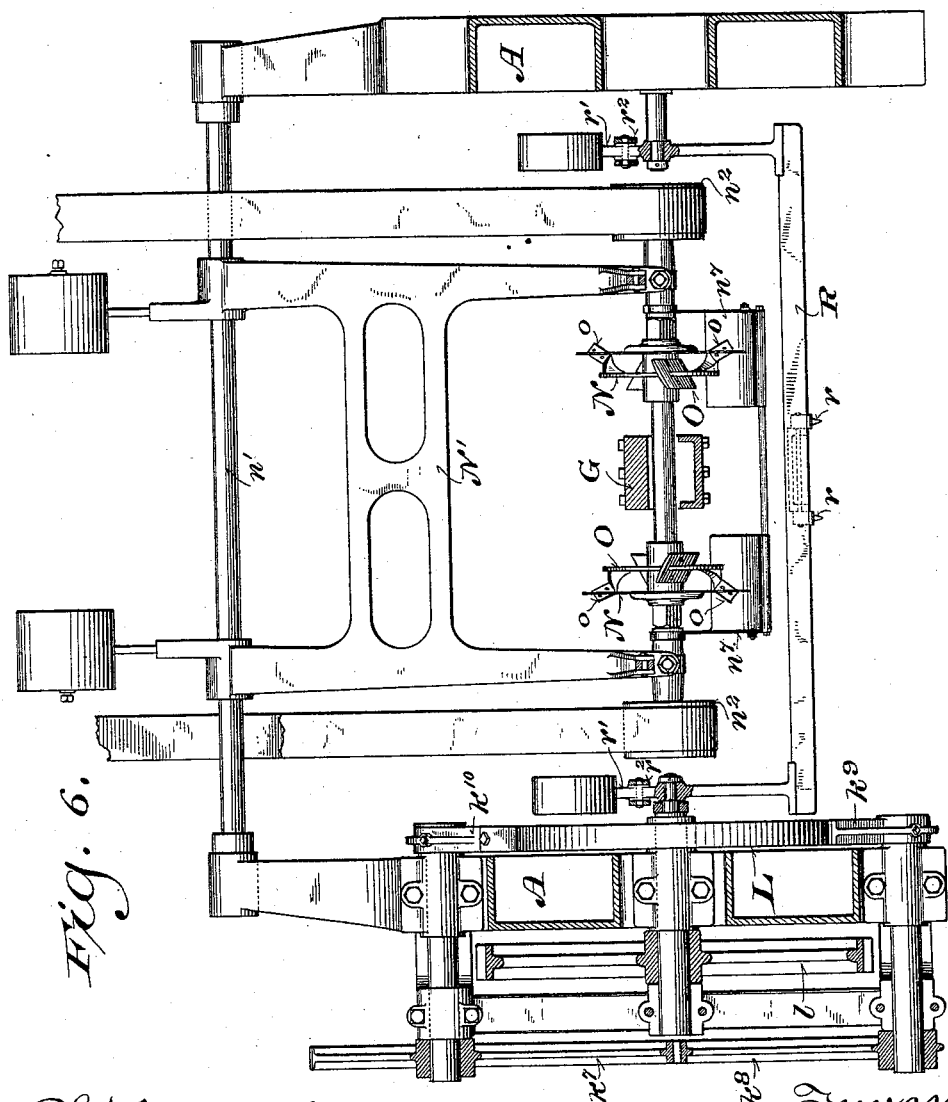

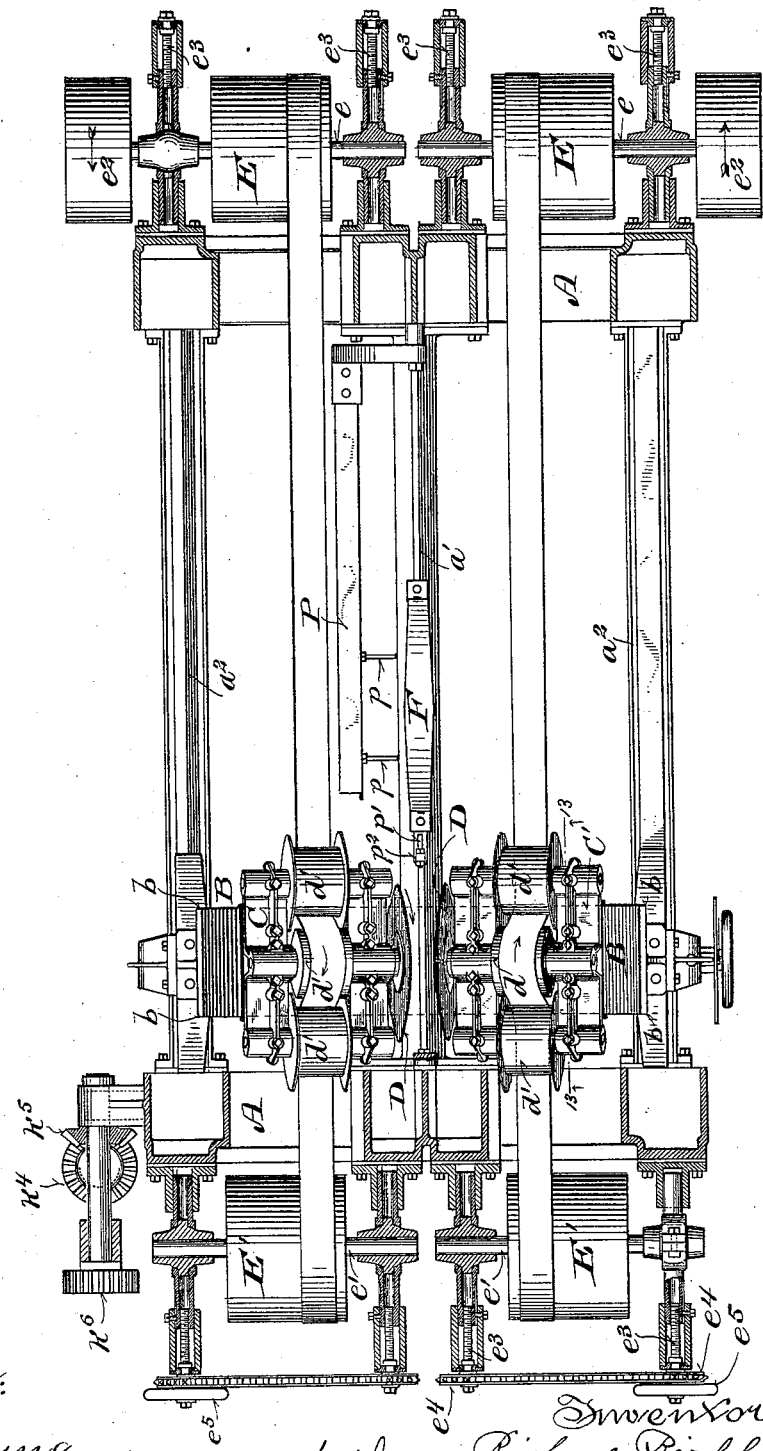

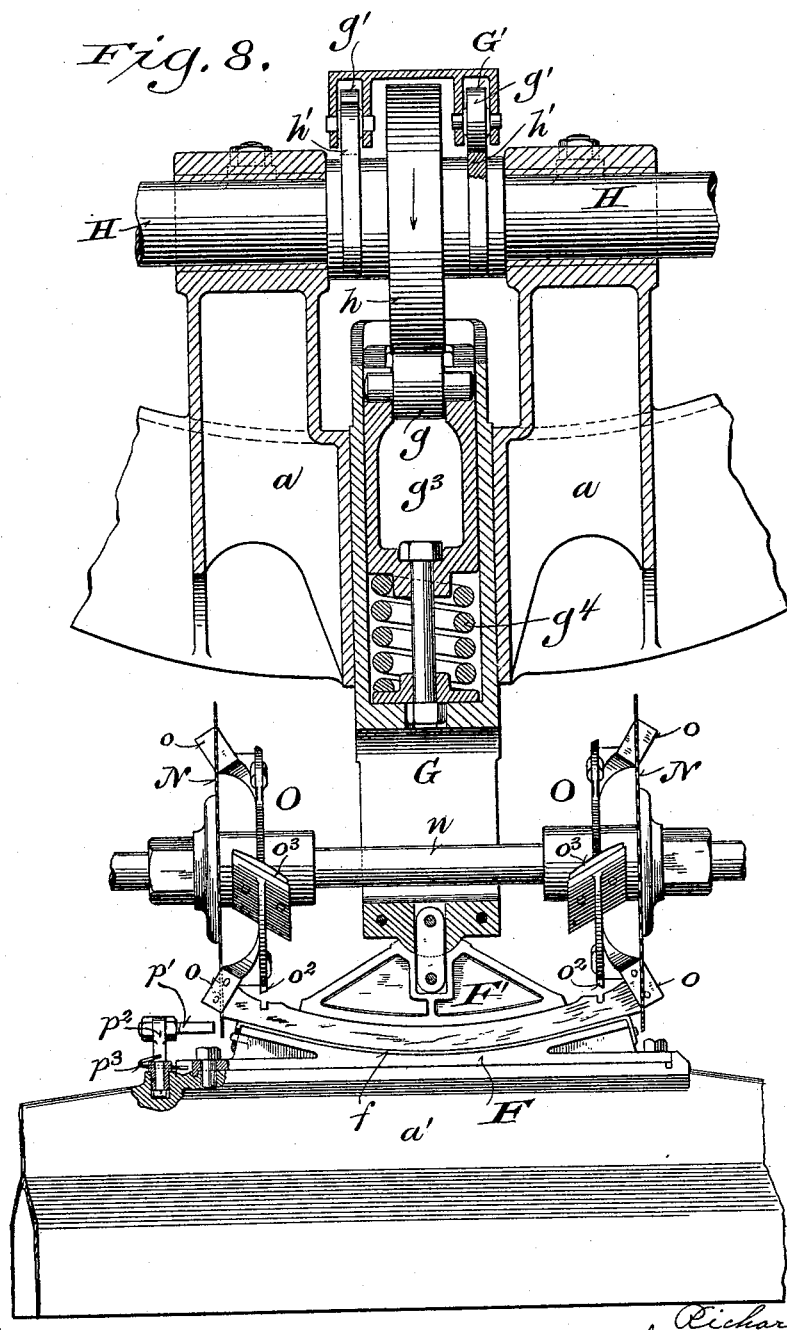

(No Model.)  12 Sheets—Sheet 9.
R. BIRKHOLZ.
STAVE MAKING MACHINE.
No. 585,178.  Patented June 29, 1897.
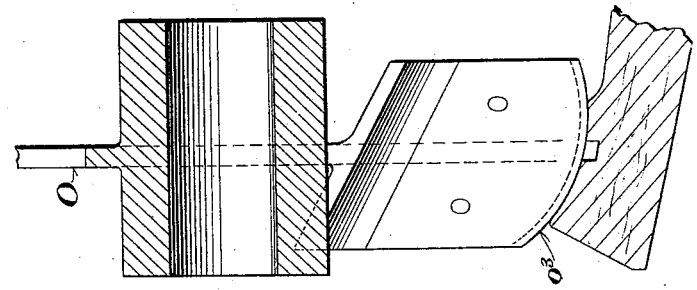
Fig. 11.
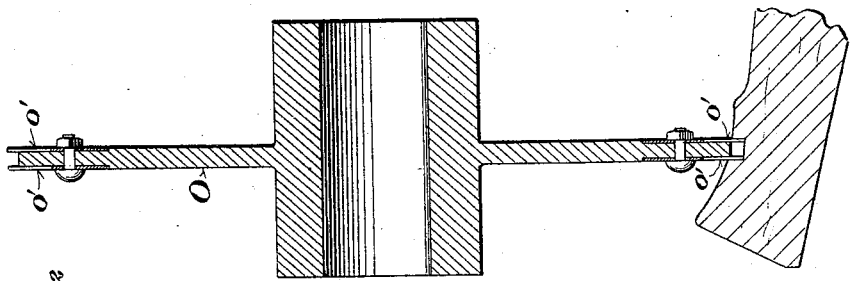
Fig. 10.
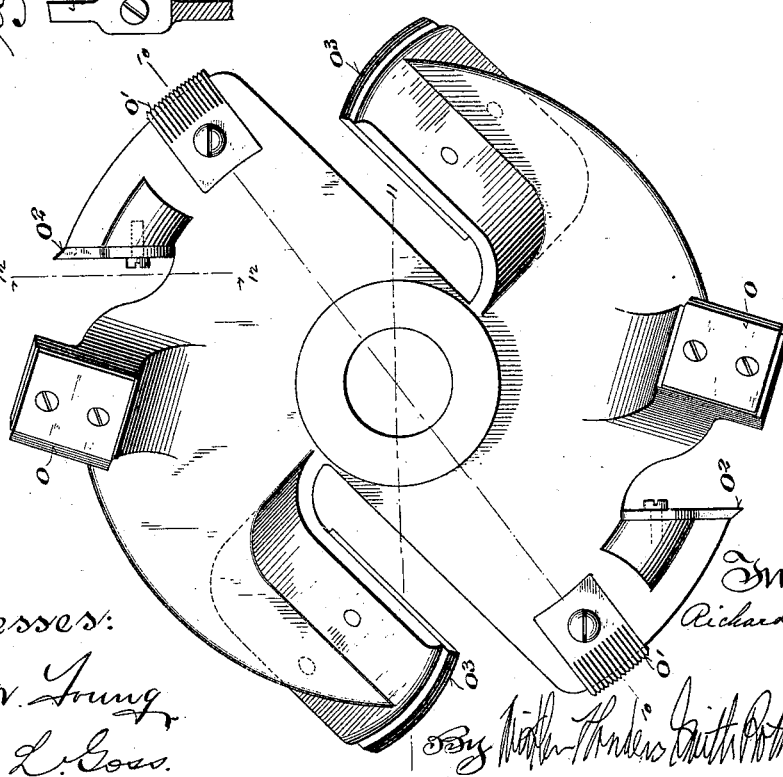
Fig. 12.
Fig. 9.
Witnesses:
Geo. W. Young
Chas. L. Goss.
Inventor:
Richard Birkholz
By Mason, Fenwick Lawrence
Attorneys.

(No Model.) 12 Sheets—Sheet 10.
R. BIRKHOLZ.
STAVE MAKING MACHINE.

No. 585,178. Patented June 29, 1897.

Witnesses:
Geo. W. Young.
Chas. L. Goss.

Inventor:
Richard Birkholz.
By
Attorneys

THE NORRIS PETERS CO., PHOTO-LITHO., WASHINGTON, D. C.

(No Model.) 12 Sheets—Sheet 11.
R. BIRKHOLZ.
STAVE MAKING MACHINE.
No. 585,178. Patented June 29, 1897.
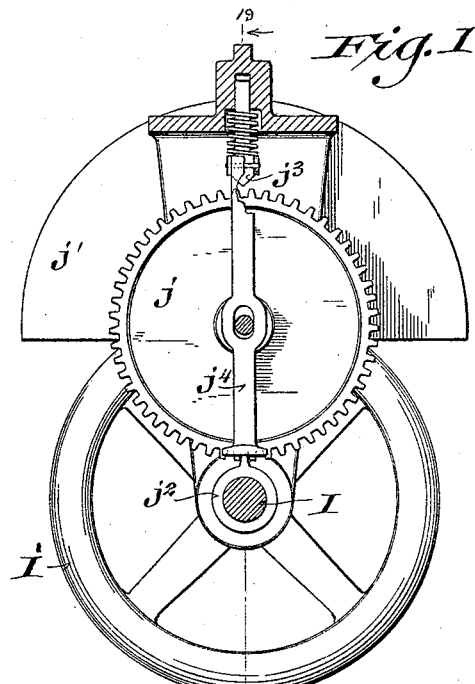
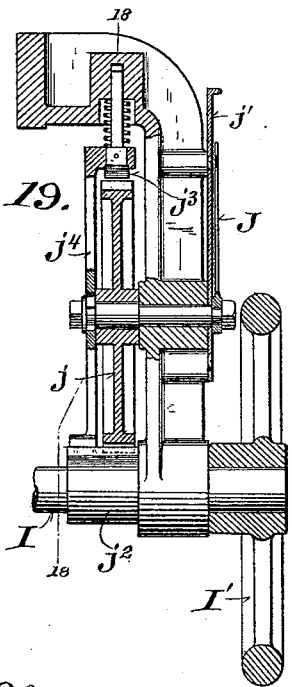
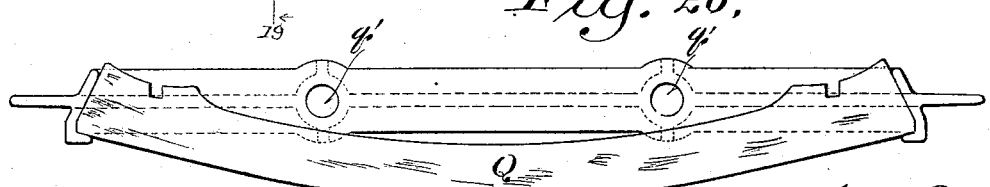
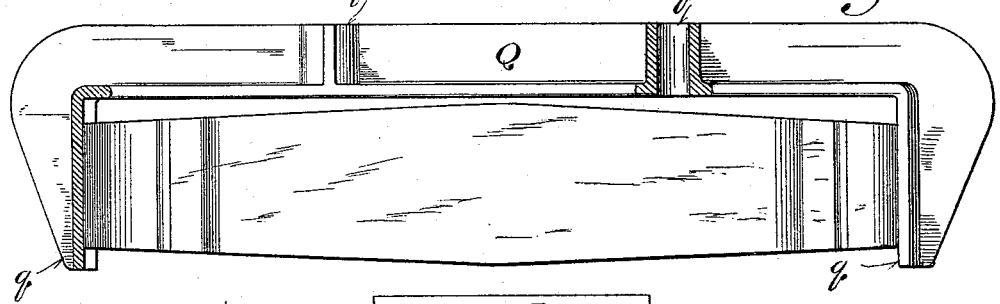
Witnesses:
Geo. W. Young
Chas. L. Goss
Inventor:
Richard Birkholz
Attorneys
THE NORRIS PETERS CO., PHOTO-LITHO., WASHINGTON, D. C.

(No Model.) 12 Sheets—Sheet 12.

R. BIRKHOLZ.
STAVE MAKING MACHINE.

No. 585,178. Patented June 29, 1897.

Witnesses:
Geo. W. Young.
Chas. L. Goss.

Inventor:
Richard Birkholz,
By his Attorneys.

UNITED STATES PATENT OFFICE.

RICHARD BIRKHOLZ, OF MILWAUKEE, WISCONSIN.

STAVE-MAKING MACHINE.

SPECIFICATION forming part of Letters Patent No. 585,178, dated June 29, 1897.

Application filed September 23, 1893. Serial No. 486,258. (No model.)

*To all whom it may concern:*

Be it known that I, RICHARD BIRKHOLZ, of Milwaukee, in the county of Milwaukee and State of Wisconsin, have invented certain new and useful Improvements in Stave-Making Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates particularly to the manufacture of that class of strong heavy barrels or casks which are designed to be subjected to internal pressure; and its main object is to facilitate and improve the construction and repair of the same.

It consists, essentially, of certain novel features in the construction and arrangement of the component parts of the machine, particularly for bending the staves and trimming, chamfering, crozing, and howeling them while they are held in the shape they are to have in a barrel, as hereinafter particularly explained and defined in the claims.

In the accompanying drawings like letters designate the same parts in the several figures.

Figure 1:
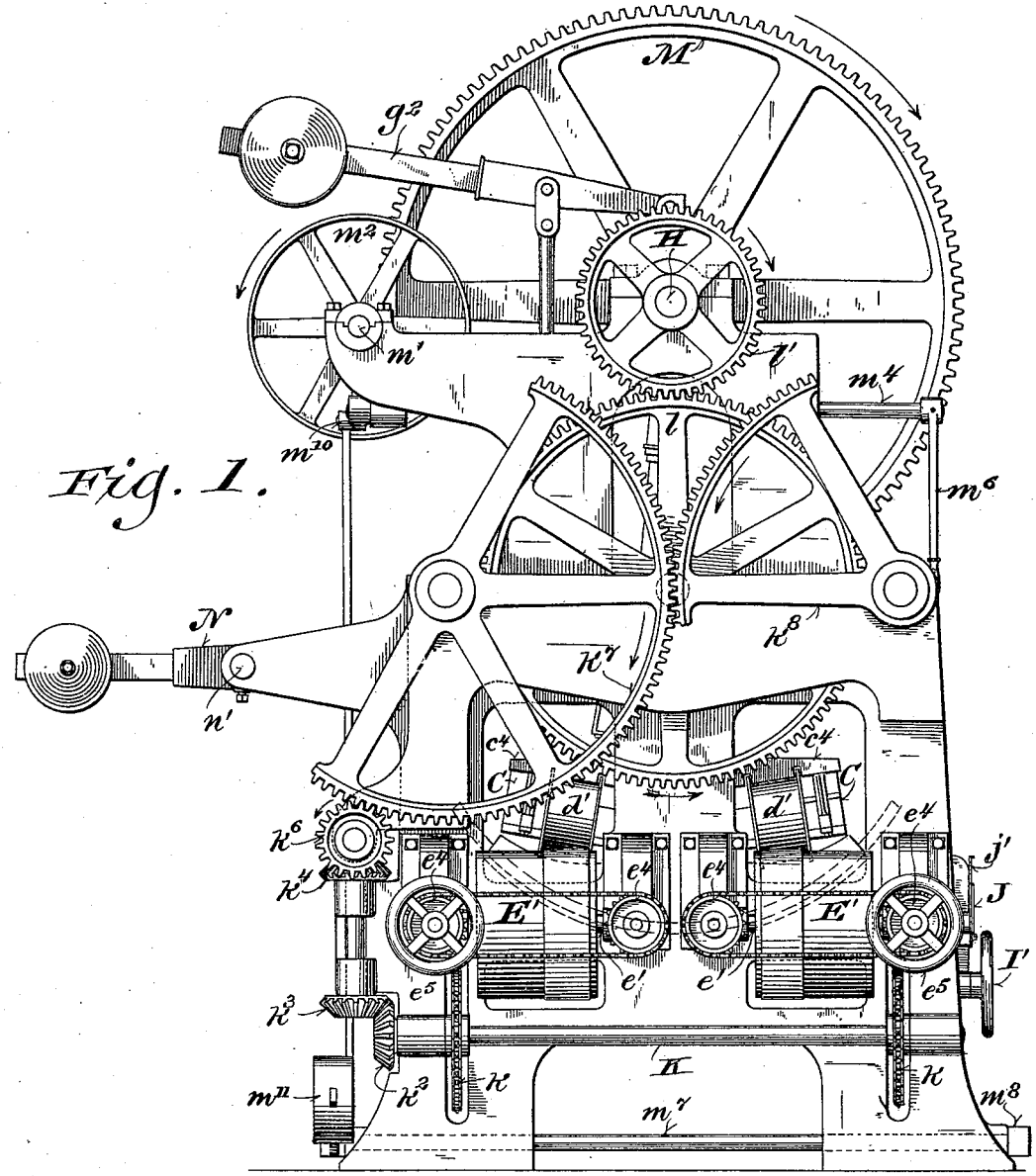
Figure 2:
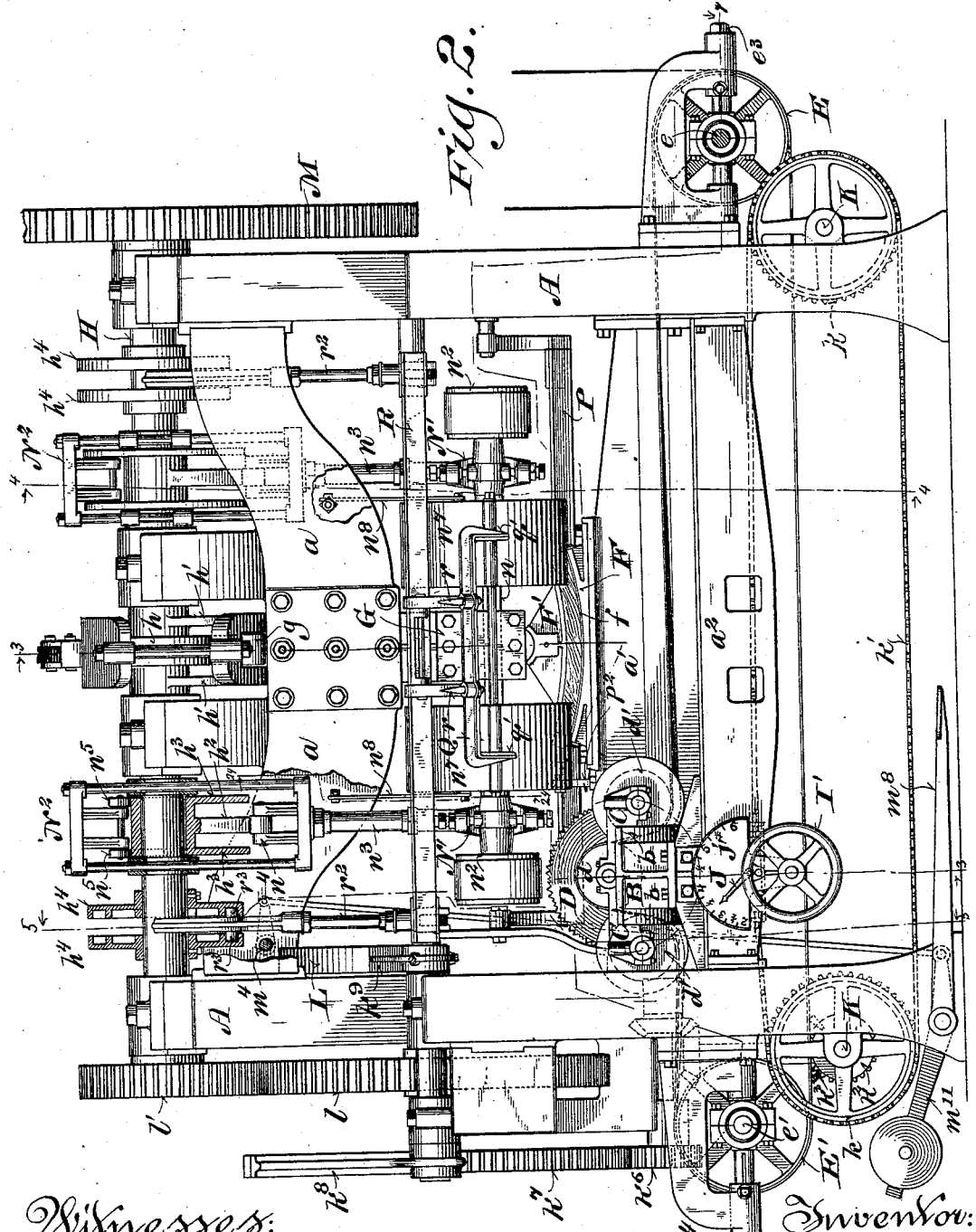
Figure 3:
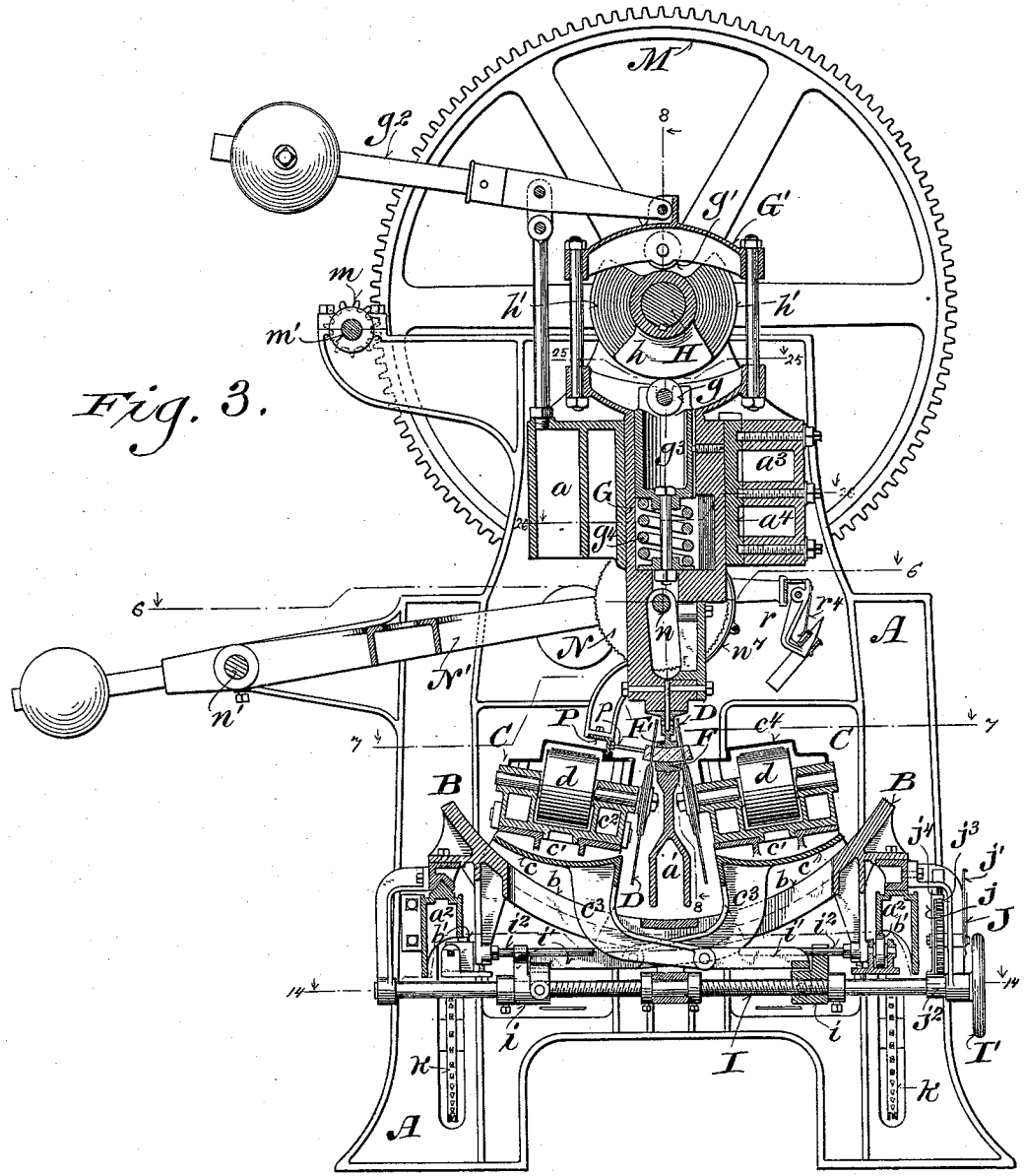
Figure 4:
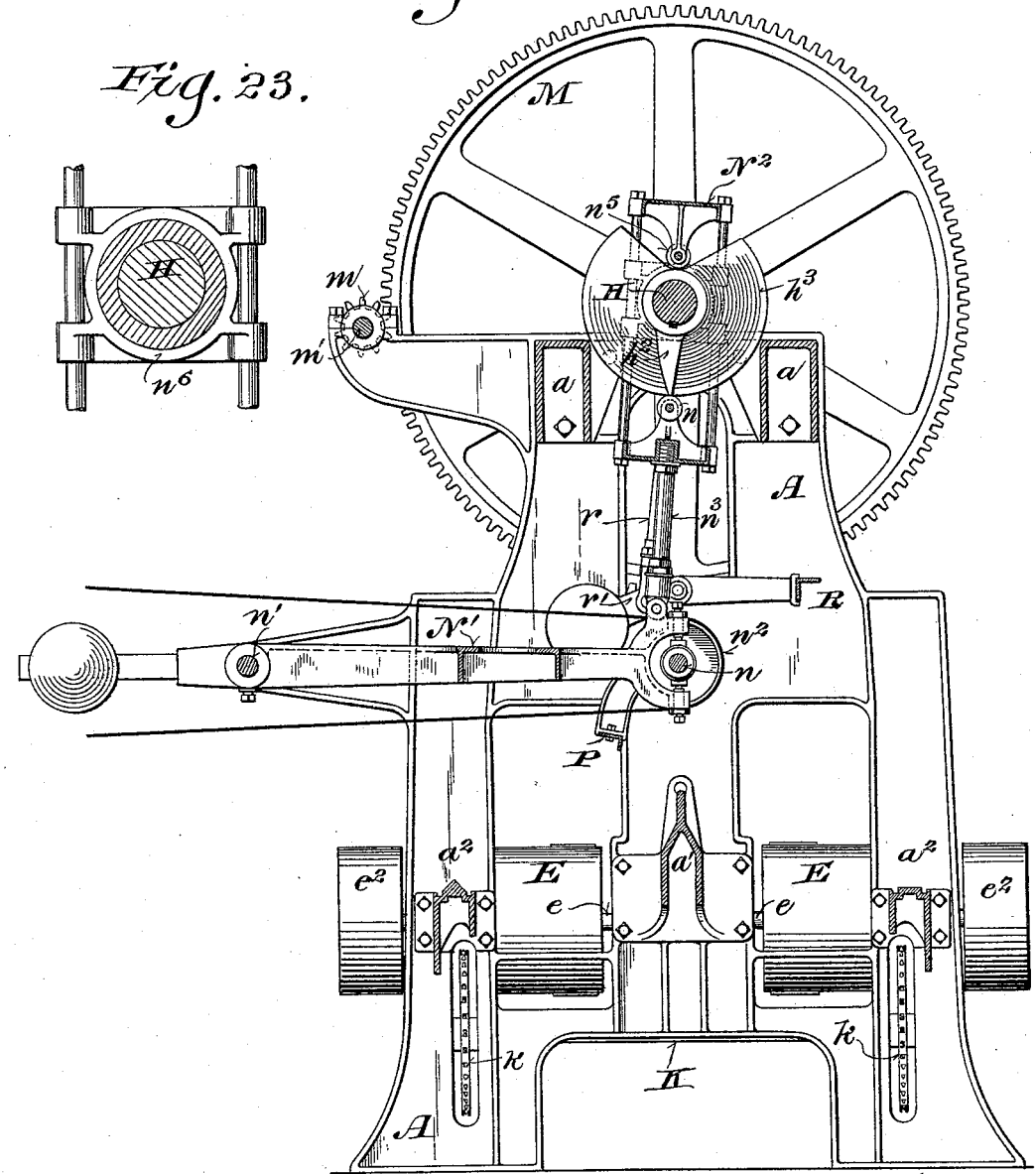
Figure 5:
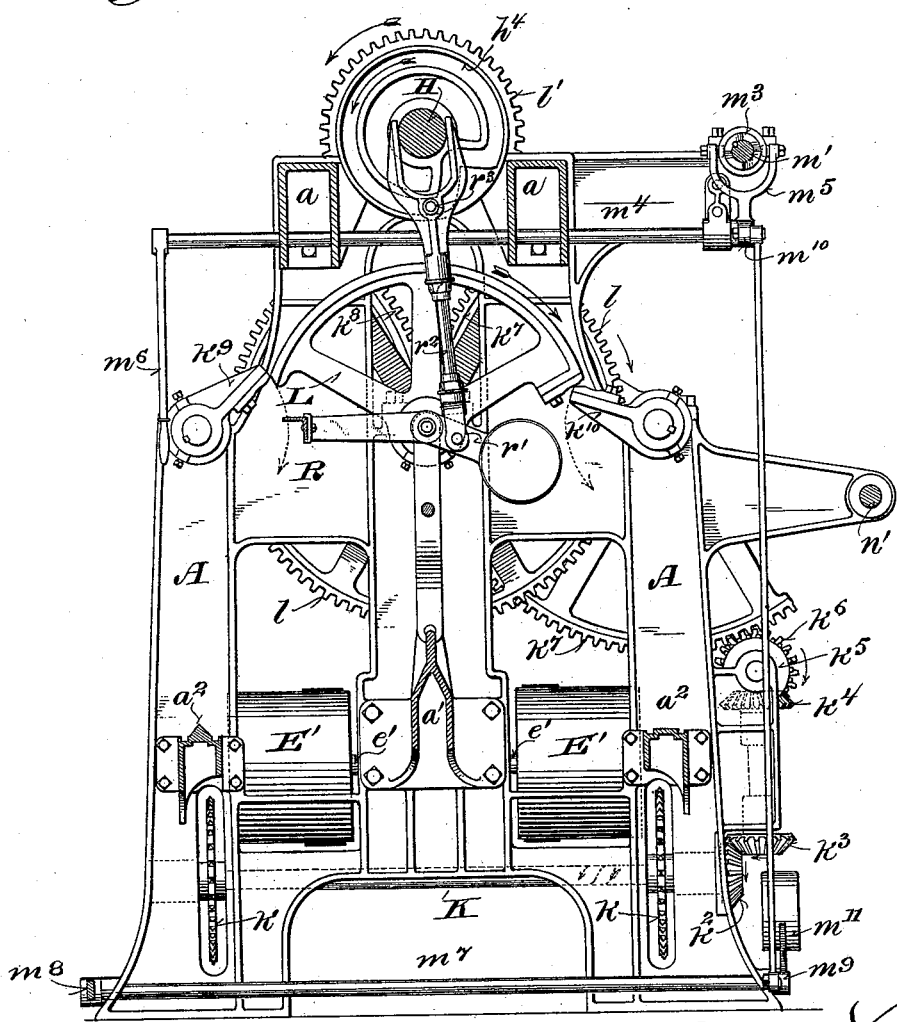
Figure 13:
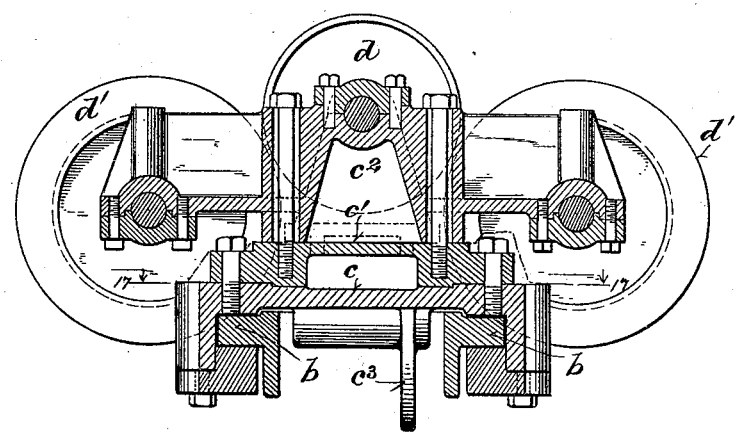
Figure 14:
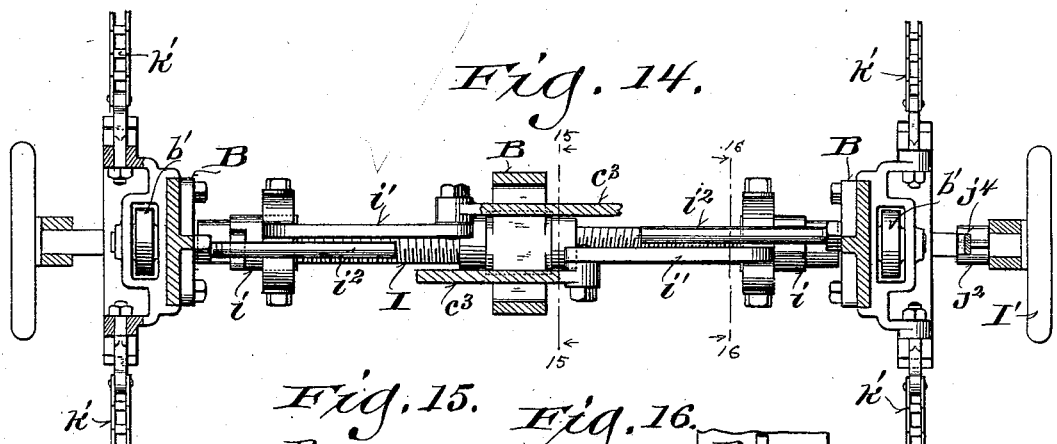
Figures 15, 16:
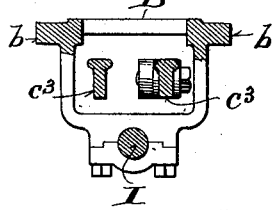
Figure 17:
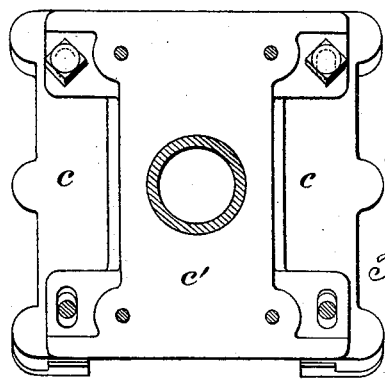
Figure 25:
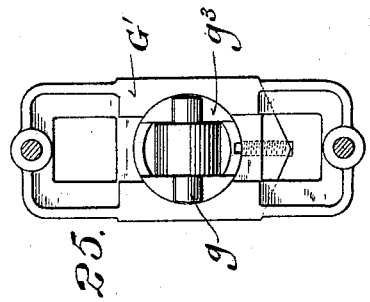
Figure 26:
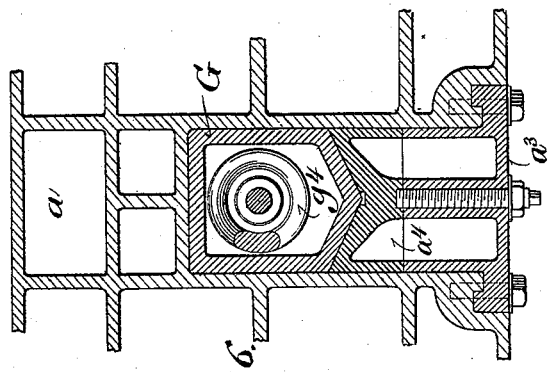
Figure 24:
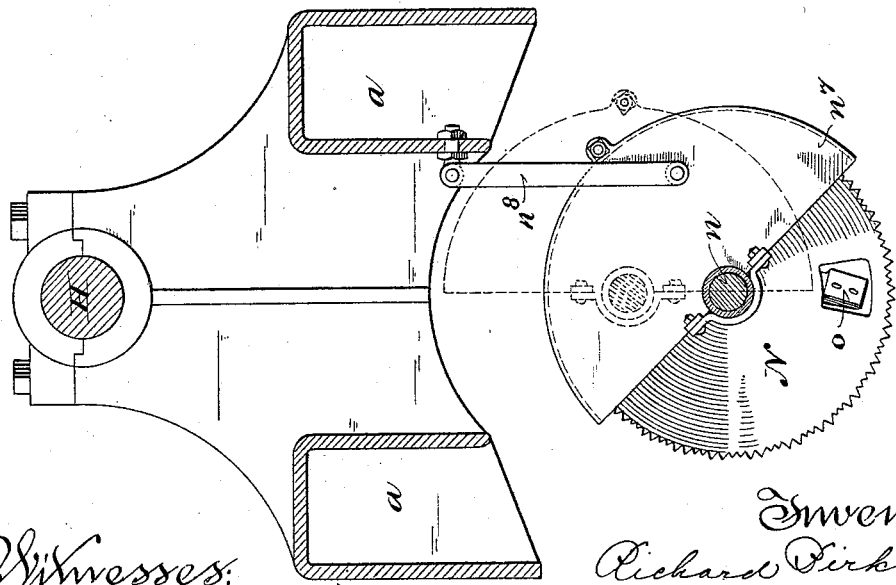

Figure 1 is an end elevation of the machine as viewed from the left with reference to Fig. 2. Fig. 2 is a front elevation. Figs. 3, 4, and 5 are vertical cross-sections on the lines 3 3, 4 4, and 5 5, respectively, Fig. 2. Figs. 6 and 7 are horizontal sections on the lines 6 6 and 7 7, respectively, Fig. 3. Fig. 8 is an enlarged vertical longitudinal section of a portion of the machine on the line 8 8, Fig. 3. Figs. 9 to 12, inclusive, are detail views, on a greatly-enlarged scale, of one of the crozing, chamfering, and howeling cutter-heads, Fig. 9 being a side elevation, and Figs. 10, 11, and 12 sections on the lines 10 10, 11 11, and 12 12, respectively, Fig. 9. Fig. 13 is an enlarged vertical longitudinal section on the line 13 13, Fig. 7, of the jointing-saw carriage and one of the saw-frames. Fig. 14 is a horizontal section on the line 14 14, Fig. 3, showing in plan view the jointing-saw-adjusting mechanism. Figs. 15 and 16 are vertical cross-sections on the lines 15 15 and 16 16, respectively, Fig. 14. Fig. 17 is a horizontal section on the line 17 17, Fig. 13. Figs. 18 and 19 are detail views, on an enlarged scale, of the jointing-saw index and stop mechanism, Fig. 18 being a vertical section on the line 18 18, Fig. 19, and Fig. 19 a section at right angles thereto on the line 19 19, Fig. 18. Figs. 20 and 21 are a side elevation and a plan view, respectively, on an enlarged scale, of one of the end holders or clamps employed with and constituting an accessory of the machine. Fig. 22 is a plan view of the lower head of the forming-clamp in connection with the end and side stops for determining the position of a stave-blank thereon. Fig. 23 is a vertical cross-section, on an enlarged scale, of the cam-shaft, showing one of the cross-head-guiding connections therewith. Fig. 24 is a vertical cross-section, on an enlarged scale, of a portion of the machine on the line 24 24, Fig. 2; and Figs. 25 and 26 are horizontal sections, on an enlarged scale, on the lines 25 25 and 26 26, respectively, Fig. 3.

A A is the frame, which may be conveniently constructed of two end castings connected by longitudinally-arranged castings $a$ and $a'$ and on opposite sides of the castings $a'$ with parallel ways $a^2 a^2$, on which is mounted a carriage B, which is formed or provided transversely to said ways with curved ways $b\ b$. Upon these last-mentioned ways are adjustably mounted saw-frames C C, which are movable thereon toward and from each other, as shown in Fig. 3. Each of these frames is preferably constructed of three parts, as shown in detail in Figs. 13 and 17 in connection with Fig. 3. The lower part or base $c$ rests upon and is secured to the ways $b\ b$ of carriage B, and is formed on the upper side to the segment of a cylinder of shorter radius than the curved ways $b\ b$, but about an axis parallel to the axis of said ways. The intermediate part $c'$ of the frame is fitted on the under side to the upper concave side of the base-section $c$ and is adjustably secured thereto by bolts. The upper section $c^2$, provided with bearings for the saw-arbor, is formed on the under side with a central cylindrical extension, which is fitted into a corresponding opening in the upper side of the intermediate section $c'$, to which it is adjustably secured by bolts.

It will be clear from the foregoing explanation in connection with the drawings that the intermediate section may be adjusted transversely upon the base c, so as to raise or lower the intersection of the saw-planes with reference to the axis of the curved ways b b, which coincides with the barrel-axis, and that the upper section may be turned horizontally on the intermediate section to adjust the saw-arbors in planes parallel with the barrel-axis and perpendicular to the saw-planes for setting the saws in planes parallel with their line of travel.

D D are the jointing-saws, the arbors of which are supported on opposite sides of the casting $a'$ in the bearings of frames C C and are provided between said bearings with pulleys $d$ $d$. The teeth of these saws are so shaped and constructed, as shown in Fig. 2, that they will make a smooth cut lengthwise of the grain in whichever direction they are moved. Upon opposite sides of each pulley $d$ are two flanged idlers $d'$ $d'$, mounted upon short shafts parallel with the saw-arbor and supported in bearings provided in the upper section $c^2$ of the saw-frame. Upon horizontal shafts $e$ $e$ $e'$ $e'$, supported in laterally-adjustable boxes at each end of the machine, are mounted driving-pulleys E E and idlers E' E' in line therewith and with the pulleys $d$ $d$ on the saw-arbors, as shown in Figs. 2 and 7. Each driver is connected with the opposite idler by a belt passing over the intermediate and corresponding pulley $d$ and underneath the flanged idlers $d'$ $d'$ on either side thereof. The driving-pulleys E E are mounted upon separate independently-adjustable shafts, each provided with a pulley $e^2$ $e^2$, through which it is connected with a suitable source of power and driven in a direction opposite that in which the other is driven, for the reason hereinafter explained.

The boxes in which the shafts $e$ and $e'$ are supported are provided on opposite sides with tubular extensions, which are held from turning, but slide endwise in sleeves of brackets which are attached to the ends of the main frame. Adjusting-screws $e^3$ $e^3$, having bearings in the outer sleeves of said brackets and threaded longitudinally into the outer tubular extensions of said boxes, afford means for the adjustment of said pulleys E and E' and for tightening the belts passing over them each independently of the other. At one end of the machine the screws $e^3$ $e^3$ are provided at their outer ends with sprocket-wheels $e^4$ $e^4$, which are connected in pairs corresponding with the boxes of each shaft $e'$ by chain belts, and one of each pair of said screws is also provided with a hand-wheel $e^5$, by means of which both boxes carrying each shaft are adjusted simultaneously, thereby preserving the parallelism of said shaft with the corresponding shaft $e$ at the opposite end of the machine when they have once been set parallel with each other. It is obvious that the shafts $e$ and $e'$ may be permanently set parallel with each other and at right angles to the travel of carriage B by means of the individual adjusting-screws $e^3$ $e^3$ at either end of the machine, the connected screws at one end of the machine being readily disconnected for such adjustments by throwing the chain belts off from the sprocket-wheels $e^4$ $e^4$.

During the operation of jointing the staves by the saws D D, as well as other operations to be hereinafter explained, the staves or the blanks from which they are made are held in the form or shape they are to have in a barrel by a clamp or holder comprising two parts, a concave bed F and a convex presser-foot F'. The bed F is rigidly attached to the casting $a'$ of the frame between and parallel with the ways $a^2$ $a^2$, and it is preferably provided with a thin elastic strip of steel attached thereto at the ends, as shown in Figs. 2 and 8, for the purpose of supporting the outer face of the stave while it is being bent into shape and preventing the breaking of the fiber, which is apt to occur in bending thick hard-wood staves. This spring-strip is stretched and stands normally in or near a straight line between the ends of the concave bed and affords a support for the fibers of the wood throughout the length of the stave while it is being bent into shape. The presser-foot F', constituting the other member of the forming-clamp, is pivotally linked, as shown in Figs. 2, 3, and 8, to a vertically-movable slide G, which has a bearing in the casting $a$ and is held in place therein by a cap $a^3$, as shown in Figs. 3 and 26. An interposed gib $a^4$, held against said slide by adjusting-screws passing through said cap, serves to take up any wear or play between said slide and its bearing. Said slide is provided at its upper end with a cross-head G', through which a horizontal cam-shaft H passes. Upon said shaft are mounted cams $h$ and $h'$ $h'$ in position to engage alternately a friction-roller $g$ in the lower side of said cross-head to depress or advance said slide and presser-foot F' and with friction-rollers $g'$ $g'$ in the upper side of said cross-head to lift or withdraw said presser-foot. The slide and its connections are counterbalanced by an adjustably-weighted lever $g^2$, fulcrumed to the frame and connected with the upper end of the cross-head G', as shown in Fig. 3.

The roller $g$ is yieldingly connected with the slide G by a block $g^3$, movable vertically therein, and a spring $g^4$, interposed between the said block and the bottom of the recess in which it is inserted, as shown in Figs. 3 and 8. By this means allowance is made for staves of different thicknesses and injury to the machine is prevented. The pivotal connection of the presser-foot F' with slide G permits said presser-foot to adjust itself to staves thicker at one end than the other, and it is allowed a limited oscillating movement on an axis in the direction of its length, whereby it adapts itself to staves thicker at one edge than the other.

Referring to Figs. 14, 15, and 16, in connection with Fig. 3, I is a cross-shaft supported at the ends and at the center in hangers attached to and depending from carriage B. It is formed on opposite sides of the center bearing with right and left screw-threads and provided with nuts $i\ i$, which are connected by links $i'\ i'$ with arms $c^3\ c^3$, projecting downwardly and inwardly from the bases of the saw-frames C C. The nuts $i\ i$ are prevented from turning with the screw-shaft I by guiding-rods $i^2\ i^2$ parallel therewith and secured to depending arms of said carriage. The carriage B is held down upon the ways $a^2\ a^2$ by friction-rollers $b'\ b'$, bearing against the under sides of said ways. Upon the front end of the screw-shaft I is fixed a hand-wheel I', by means of which it is turned and the jointing-saws D D moved toward and from each other upon the ways $b\ b$.

Referring to Figs. 18 and 19, in connection with Figs. 2 and 3, J is an index fixed upon the front end of the shaft of a gear $j$ and arranged to indicate upon a graduated dial $j'$, attached to carriage B, the different widths of staves the machine is designed to make. The screw-shaft I is provided with a pinion $j^2$, having one tooth arranged to engage at every revolution of said shaft with the gear $j$ and turn it in either direction the distance of one tooth. The gear $j$ is normally held from turning by a spring-actuated stop $j^3$, engaging the teeth thereof diametrically opposite the pinion $j^2$. A bar $j^4$, having a sliding connection with the end of the shaft of gear $j$, is attached at its upper end to said stop and is formed at its lower end with a foot in the path of the single tooth on pinion $j^2$. It serves to move the stop out of engagement with the gear $j$ every time it is engaged by the tooth of pinion $j^2$.

In the machine as herein shown and described the jointing-saws D D are arranged to be set at distances from each other varying by one-fourth of an inch to joint staves from two to six inches in width midway between their ends, and the index and dial with which it works are arranged to indicate automatically any of the several widths of staves the saws D D may be set to joint.

At each end of the machine upon cross-shafts K K are mounted sprocket-wheels $k\ k$, which are connected by chain belts $k'\ k'$ with depending arms on each side of the carriage B, as shown in Figs. 1, 2, 3, and 5. The shaft K at one end of the machine is provided at its rear end with a bevel-gear $k^2$, which meshes with a similar gear $k^3$ on a short vertical shaft, provided at its upper end with a bevel-gear $k^4$, meshing with a similar gear $k^5$ on a horizontal shaft, (shown in Fig. 7,) provided with a pinion $k^6$, which meshes with the large segment-gear $k^7$. (Shown in Fig. 1.) The gear $k^7$ meshes with a similar segment-gear $k^8$, and upon the opposite ends of the short shafts of said gears $k^7$ and $k^8$ are fixed (see Fig. 5) inwardly-projecting arms $k^9$ and $k^{10}$ on opposite sides of a cam L, mounted upon a shaft parallel with and equidistant from the shafts of said screws $k^7$ and $k^8$. The cam-shaft is provided at its outer end with a gear $l$, meshing with a smaller gear $l'$ on the shaft H. The cam-shaft H is provided at the opposite end with a gear M, which meshes with a pinion $m$ on a parallel driving-shaft $m'$ at the rear side of the machine. Upon this shaft is loosely mounted a pulley $m^2$, which may be connected with a pulley on a suitably-located countershaft and driven in the direction indicated by the arrow in Fig. 1. It is connected or disconnected with the shaft $m$ at the will of the operator by means of a clutch $m^3$ and its connections. (Shown in Fig. 5.) These connections comprise a rock-shaft $m^4$, connected at its rear end with one member of the clutch by a forked arm $m^5$ and extending transversely across the upper part of the machine and provided at its front end with a lever $m^6$, by which the clutch is disengaged, and a parallel rock-shaft $m^7$ near the floor, provided at its front end with a foot-lever $m^8$, by which the clutch is thrown into engagement, and provided at its rear end with a crank-arm $m^9$, which is connected by a rod with a similar crank-arm $m^{10}$ on the rock-shaft $m^4$. The rock-shaft $m^7$ is also provided at its rear end with an adjustably-weighted arm $m^{11}$, which tends to open said clutch. By means of the connections just described the operator is enabled, without leaving his position at the front of the machine, to instantly stop or start the feeding mechanism, by which the presser-foot of the forming-clamp and the several cutters are caused to operate.

Referring to Figs. 2, 3, 4, 6, and 8, N N are a pair of trimming-saws mounted upon a horizontal shaft $n$, which is supported in a vertically-swinging frame N', parallel with the ways $a^2\ a^2$ and with the barrel-axis. By the term "barrel-axis," as herein employed, I mean the imaginary longitudinal center of a cask or barrel, of which a stave held in the forming-clamp F F' would form a part. The frame N' is mounted upon a shaft $n'$, supported by rearwardly-projecting arms of the frame parallel with the ways $a^2\ a^2$, and is provided on the rear side of said shaft with adjustable counterweights. The shaft $n$ is provided at the ends with pulleys $n^2\ n^2$, which are connected by belts with driving-pulleys on a suitably-located counter-shaft. The saws N N are set at the required distance apart to trim staves to the exact length desired when they are held in the form they are to have in a barrel by the forming-clamp F F'.

O O are a pair of cutter-heads mounted upon the shaft $n$. Just inside of the saws N N each cutter is provided, as shown in detail in Figs. 9 to 12, inclusive, with chamfering-cutters $o\ o$, which project through openings in the trimming-saws N N, as shown in Figs. 6 and 24, with crozing-cutters $o'\ o'$ and $o^2\ o^2$ and howeling-cutters $o^3\ o^3$. The crozing-cutters $o'\ o'$ are arranged in pairs to cut a croze of the required width and depth, and the cutters $o^2\ o^2$ are arranged to remove the material lying between the path of the cutters $o'\ o'$. The chamfering and howeling cutters are set obliquely to the plane of rotation, so as to produce a smooth shearing cut. The several cutters being rigidly connected with each other upon the rotary shaft $n$ and occupying invariably the same positions relatively to each other and to the forming-clamp will chamfer, croze, and howel staves exactly alike, equidistant from the widest point therein and from the outside of the staves, which are invariably held in the same position in the machine during the operation of the cutters thereon by the fixed bed F of the forming-clamp. The swinging frame N' is connected at or near each end by rods $n^3\ n^3$ with cross-heads $N^2\ N^2$, which have guiding connections with the cam-shaft H and are provided at opposite ends with friction-rollers $n^4$ and $n^5\ n^5$ in the path of advancing and retracting cams $h^2$ and $h^3\ h^3$, mounted upon said shaft. The guiding connection between the cross-heads $N^2$ and the cam-shaft H consists of collars $n^6$, loosely mounted upon said shaft and provided with tangential hubs through which the parallel guide-rods of said cross-heads pass, as shown in detail in Fig. 23. The saws N N and cutter-heads O O are covered on the front side by semicylindrical guards $n^7\ n^7$, which are loosely and concentrically connected with the shaft $n$ at the outer side of each saw and are connected by links $n^8\ n^8$ with the frame above, as shown on an enlarged scale in Fig. 24. The cams $h^2\ h^2$ on shaft H are constructed and arranged to advance and withdraw the saws N N and cutter-heads O O toward and from the forming-clamp F F' once to each revolution of said shaft H. The diameter of the saws N N and of the circle described by the knives mounted on the cutter-heads O O is approximately the same as the smaller diameter of the casks or barrels for which the machine is designed to make the staves, and the shaft $n$, upon which said saws and cutter-heads are mounted, is in working position coincident or nearly so with the barrel-axis.

Referring to Figs. 3, 7, and 22, $p\ p$ are gage-stops attached to a swinging frame or bar P, parallel with the ways $a^2\ a^2$, formed or provided at the ends with crank-arms pivoted to the frame in or near the line of the barrel-axis, and is guided and held in place by a groove with which it engages in the cover $c^4$ of the rear saw-frame, as shown in Fig. 3. These stops are located a little above and to the rear of the bed F of the forming-clamp and determine the position sidewise of the stave-blanks upon said bed. They are adjusted simultaneously with the jointing-saws D D by means of the screw-shaft I, above described, for jointing staves of different widths. The position of the stave-blanks endwise upon the bed F is determined by a gage-stop $p'$, carried by a vertical spindle $p^2$, swiveled in the frame and yieldingly held in operative position by a spring $p^3$.

Referring to Figs. 20 and 21 in connection with Figs. 2 and 3, Q represents an end clamp or holder formed at the ends with two right-angled arms or offsets $q\ q$, which are flanged or grooved lengthwise to exactly fit and to slip edgewise over the ends of a trimmed stave when it is bent and held in shape in the forming-clamp and to prevent the same from straightening when it is released by said forming-clamp and removed from the machine. It is also formed with two sleeves or apertures $q'$, by means of which it is detachably connected with hooks $r\ r$, pivotally connected with a swinging frame or bar R, formed or provided at the ends with crank-arms, which are pivoted to the frame of the machine in a line parallel with the barrel-axis, as shown in Figs. 2, 3, 4, 5, and 6. The frame or bar R is formed or provided on the rear side of its axis with weighted arms $r'\ r'$, to which are pivoted the lower ends of adjustable connecting-rods $r^2$, provided at their upper ends with forks embracing the cam-shaft H, upon which are mounted in pairs, at or near each end, cams $h^4\ h^4$, one on each side of the forked ends of said connecting-rods. These cams are provided in their adjacent faces with corresponding grooves, which engage with friction-rollers $r^3\ r^3$, projecting from opposite sides of said connecting-rods. The hooks $r\ r$ are provided with spring-catches $r^4$, by which the end-holders Q are yieldingly retained thereon. The construction and arrangement of the frame or bar R, constituting the end-clamp carrier and its connections, are such as to force the clamp or holder yieldingly held thereon over the ends of a finished stave while it is held in the forming-clamp F F' and to withdraw it therefrom when said clamp opens. The pulleys and bearings of the jointing-saw frames C C, which are particularly exposed to sawdust and splinters produced by the jointing-saws, are protected by covers $c^4\ c^4$. (Shown in Fig. 3.) These covers are omitted from the other figures.

My improved machine operates as follows: The blanks, which are usually formed approximately to shape, particularly on the outside, but of the same width throughout and unbent, are thoroughly steamed to put them in suitable condition for bending. An end holder or clamp, of which each machine is supplied with a sufficient number, is placed by the operator upon the hooks $r\ r$. A blank is then taken and placed by the operator with the outside on the bed F, the rear edge against the gage-stops $p\ p$ and one end against the gage-stop $p'$. The jointing-saws D D are set by means of the screw-shaft I, in the manner hereinbefore explained, to cut a stave of the greatest width which can be made from said blank. The feeding mechanism by which the several saws and cutters and the presser-foot of the forming-clamp are operated is set in motion by means of the foot-lever $m^8$, as already explained. The cam-shaft H, turning in the direction indicated by arrows on Fig.

1, operates through the cam $h$ to force the presser-foot F' down upon the blank and bend it lengthwise into the form which it is to have in a barrel, as shown in Figs. 2 and 8. While the blank is held in this position, the shaft $n$, with the trimming-saws N N and the cutter-heads O O, carrying the chamfering, crozing, and howeling-knives, is moved downward into operative position by the cams $h^2 h^2$, trimming the stave to exact length and simultaneously chamfering, crozing, and howeling the same. These crosscut-saws and knives are next withdrawn upward by the cams $h^3 h^3$, and, assuming the jointing-saws to be in the position in which they are shown in Fig. 2, the gear $l'$ on the cam-shaft, operating through the gear $l$, cam L, arm $k^{10}$, segment-gear $k^7$, gears $k^6$, $k^5$, $k^4$, $k^3$, and $k^2$, turns the sprocket-wheels $k$ $k$, and through the chain belts $k' k'$, mounted thereon, moves the carriage B and the jointing-saws D D to the right. The saws D D, being set in planes intersecting each other in or a little above the barrel-axis and moving lengthwise past and on opposite sides of the forming-clamp, accurately joint the edges of the staves held therein, so that they will exactly fit the meeting edges of other staves, which are made by the machine and with which they are assembled in a barrel. If the jointing-saws are set in planes intersecting each other a little above the barrel-axis, the joints between the meeting edges of staves will be slightly open on the outside, but if they are set in planes intersecting each other in the barrel-axis uniform contact will be made between the entire width of the jointed edges of the staves. The construction and arrangement of the cam L and the arms $k^9$ and $k^{10}$ is such as to produce an intermitting and alternating forward-and-back movement of the carriage B, the carriage remaining quiescent at each end of the machine while the curved eccentric portion of the cam L passes in engagement with either of said arms $k^9$ or $k^{10}$ after it has reached the limit of its movement produced by said cam. Immediately following the operation of the jointing-saws an end-holder Q is automatically carried by the swinging bar R into position and forced over the ends of the finished stave. The cam $h$ thereupon clears the friction-roller $g$, releasing the presser-foot, which is withdrawn upward by the cams $h' h'$. The end-holder is then withdrawn, carrying the stave with it, by the operation of the cams $h^4 h^4$, which turn the swinging bar or frame R upwardly into its normal position, in which it is shown in Figs. 2 and 3. Another blank is placed by the operator on the bed in the manner above mentioned and the operations just explained are repeated, except that the jointing-saws are moved back from right to left. It will thus be seen that by each movement of said saws from left to right and right to left a stave is jointed simultaneously on both sides. The finished stave is then removed from the machine with the holder, in which it is left until it has been dried sufficiently to retain its shape. By rotating the jointing-saws D D in opposite directions the crawling tendency of either saw when cutting under the grain is counteracted by the opposite saw-edges cutting against the grain. A uniform feed-movement of the saws and smooth unbroken cuts by both saws are insured. The jointing-saws, operating after the trimming-saws, chamfering, crozing, and howeling cutters have operated, remove the splintered edges which are produced by the saws and cutters working across the grain and insure perfect work where the trimming, chamfering, crozing, and howeling cuts intersect the jointing-cuts.

It is evident from the foregoing explanation of the construction and operation of the machine that staves produced by it will exactly correspond and that they will exactly fit together when assembled in a cask or barrel, thus avoiding hand-fitting and greatly facilitating and improving the construction of the barrels and casks made therefrom. It is obvious also that replacing broken or imperfect staves in barrels constructed of staves made by my machine will be greatly simplified and facilitated, because any stave of a given width will exactly fit into the place occupied by a stave of corresponding width.

Various changes in the details of construction and arrangement of the component parts of the machine may be made within the spirit and intended scope of my invention.

I claim—

1. In a stave-making machine the combination with a forming-clamp constructed and arranged to press a stave into and hold it in the shape it is to have in a barrel, of an end clamp or holder formed with two parallel laterally-bent arms which are grooved or flanged lengthwise to slip edgewise over the ends of a trimmed stave while it is held in said forming-clamp, and to prevent the stave from straightening after it is removed from the machine, substantially as and for the purposes set forth.

2. In a stave-making machine, the combination with a forming-clamp, of trimming-saws movable toward and from said clamp in a direction transverse to its length, and an end clamp or holder constructed and arranged to grasp the ends of a stave and hold it in shape when it is released by the forming-clamp, substantially as and for the purposes set forth.

3. In a stave-making machine the combination with a forming-clamp of end trimming and shaping cutters movable transversely thereto, an end clamp or holder constructed and arranged to embrace the ends of a stave and to hold it in shape when it is removed from said forming-clamp, and mechanism for automatically carrying the end-clamp over the ends of the stave after said cutters have operated thereon and before it is released by said forming-clamp, and for removing it therefrom when said forming-clamp opens, substantially as and for the purposes set forth.

4. In a stave-making machine the combination with a forming-clamp of a pair of jointing-cutters movable lengthwise and on opposite sides of said clamp, an end clamp or holder constructed and arranged to embrace the ends of a stave held in said forming-clamp and to prevent its straightening when it is removed therefrom, and mechanism for automatically carrying the end-clamp into place over the ends of a stave after said cutters have operated thereon, and before it is released by said forming-clamp and for removing it therefrom when it is released by said forming-clamp, substantially as and for the purposes set forth.

5. In a stave-making machine the combination with a forming-clamp of jointing-saws movable lengthwise and on opposite sides of said clamp, a pair of trimming-saws mounted on a shaft which is parallel with the barrel-axis and movable toward and from said clamp, an end clamp or holder constructed and arranged to embrace the ends of a stave while it is held in the forming-clamp and to prevent its straightening when it is removed therefrom, and mechanism for automatically carrying the end-clamp into operative position over the ends of a stave after said saws have operated thereon, and before it is released by the forming-clamp, substantially as and for the purposes set forth.

6. In a stave-making machine the combination with a forming-clamp of a pair of jointing-saws movable lengthwise and on opposite sides of said clamp, end trimming and shaping cutters mounted upon a rotary shaft which is parallel with the barrel-axis, movable toward and from said clamp, an end clamp or holder constructed and arranged to embrace the ends of a stave held in said forming-clamp and to prevent its straightening when it is removed therefrom, and mechanism for automatically carrying the end-clamp into position to engage the ends of a stave after said cutters have operated thereon, and before it is released by the forming-clamp, substantially as and for the purposes set forth.

7. In a stave-making machine the combination of a stationary clamp consisting of fixed and movable parts shaped to the outer and inner curvature of a stave, mechanism for automatically closing said clamp upon a stave and holding it in the shape it is to have in a barrel while it is being trimmed to length and jointed, and for opening the clamp after the stave is trimmed and jointed, a pair of trimming-cutters movable transversely across the ends of said clamp, mechanism for automatically moving said cutters into and out of operative position, a pair of jointing-saws movable on opposite sides and lengthwise of said clamp in planes which intersect each other in a straight line coincident or parallel with the barrel-axis, and mechanism for moving said saws alternately back and forth after each operation of the trimming-cutters, substantially as and for the purposes set forth.

8. In a stave-making machine the combination of a stationary clamp consisting of fixed and movable parts shaped to the outer and inner curvature of a stave, mechanism for automatically closing said clamp upon a stave and holding it in the shape it is to have in a barrel, while it is being crozed and jointed, and for opening the clamp after the stave is crozed and jointed, a pair of crozing-cutters mounted on a shaft which is parallel with the barrel-axis and movable transversely thereto toward and from said clamp, mechanism arranged to advance and withdraw said cutters to and from operative position, jointing-saws movable on opposite sides and lengthwise of said clamp in planes which intersect each other in a straight line coincident or parallel with the barrel-axis, mechanism for rotating said saws in opposite directions, and mechanism arranged to automatically move said saws alternately back and forth after each operation of the crozing-cutters, substantially as and for the purposes set forth.

9. In a stave-making machine the combination of a stationary forming-clamp consisting of fixed and movable parts shaped to the outer and inner contour of a stave, mechanism for automatically closing said clamp upon a stave and holding it in the shape it is to have in a barrel while it is being chamfered and jointed and for opening the clamp after the stave has been chamfered and jointed, chamfering-cutters mounted on a shaft which is parallel with the barrel-axis and movable transversely thereto toward and from said clamp, mechanism connected with and arranged to advance and withdraw said cutters at intervals to and from operative position, a pair of jointing-saws movable on opposite sides and lengthwise of said clamp in planes which intersect each other in a straight line coincident or parallel with the barrel-axis, mechanism for rotating said saws in opposite directions and mechanism for feeding said saws alternately back and forth after each operation of the chamfering-cutters, substantially as and for the purposes set forth.

10. In a stave-making machine the combination of a stationary forming-clamp consisting of fixed and movable parts shaped to the outer and inner curvature of a stave, mechanism for automatically closing said clamp upon a stave and holding it in the shape it is to have in a barrel while it is being howeled and jointed and for opening the clamp after the stave has been howeled and jointed, a pair of howeling-cutters mounted on a shaft which is parallel with the barrel-axis and movable transversely thereto toward and from said clamp, mechanism arranged to advance and withdraw said cutters at intervals to and from operative position, a pair of jointing-saws movable on opposite sides and lengthwise of said clamp in planes which intersect each other in a straight line coincident or parallel with the barrel-axis, mechanism for rotating said saws in opposite directions and mechanism for feeding the saws alternately back and forth after each operation of the howeling-cutters, substantially as and for the purposes set forth.

11. In a stave-making machine, the combination with a stationary forming clamp or holder constructed and arranged to immovably hold a stave in the shape it is to have in a barrel, of ways parallel with the barrel-axis, a carriage mounted and movable back and forth upon said ways and provided with transverse curved ways concentric with said barrel-axis, two saw-frames mounted upon said curved ways and provided with bearings capable of angular adjustment thereon in planes perpendicular to the saw-planes and parallel with the carriage-ways, and jointing-saws having arbors supported in said bearings, substantially as and for the purposes set forth.

12. In a stave-making machine, the combination with a stationary forming clamp or holder constructed and arranged to immovably hold a stave in the shape it is to have in a barrel, of ways parallel with the barrel-axis, a carriage mounted and movable back and forth upon said ways and provided with transverse curved ways concentric with the barrel-axis, two saw-frames movable upon said transverse ways toward and from each other and each provided with bearings capable of angular adjustment thereon in a vertical plane and in planes perpendicular thereto and parallel with the carriage-ways, and jointing-saws having arbors supported in said bearings, substantially as and for the purposes set forth.

13. In a stave-making machine the combination of a stationary clamp constructed and arranged to immovably hold a stave in the shape it is to have in a barrel, parallel ways extending lengthwise of the machine on opposite sides of said clamp, a carriage mounted and movable back and forth upon said ways, a pair of jointing-saws mounted upon said carriage and adjustable transversely to the ways on which it travels, mechanism constructed and arranged to move said saws simultaneously toward and from each other, and an index connected therewith and showing the space between the saws, substantially as and for the purposes set forth.

14. In a stave-making machine, the combination of a stationary clamp or work-holder, a carriage movable lengthwise of said clamp or holder, and provided on opposite sides thereof with saw-frames movable toward and from each other, a right-and-left screw-shaft journaled in said carriage and provided with nuts which are connected with said saw-frames so as to move the same equally and simultaneously toward and from a central vertical plane, and jointing-saws mounted in said frames so as to pass on opposite sides of said clamp or holder, substantially as and for the purposes set forth.

15. In a stave-making machine, the combination with a suitable frame provided with parallel ways and between them with a clamp or work-holder, of a carriage mounted upon said ways and provided with transverse curved ways concentric with the barrel-axis, two saw-frames mounted on said curved ways so as to pass on opposite sides of said clamp or holder, a cross-shaft supported by said carriage and provided with right and left screw-threads, nuts mounted on the threaded portions of said shaft and connected by links with said saw-frames, and guides engaging said nuts parallel with the screw-shaft, substantially as and for the purposes set forth.

16. In a stave-making machine, the combination with a clamp or work-holder of a pair of jointing-saws movable toward and from each other, a right-and-left screw connected with said saws so as to adjust the same equally and simultaneously toward and from a central perpendicular plane, a graduated scale, an index movable adjacent thereto, and a gear fixed on the index-shaft and arranged to be engaged and turned at intervals by a tooth or projection on said screw, substantially as and for the purposes set forth.

17. In a stave-making machine, the combination with a clamp or work-holder and a pair of jointing-saws movable toward and from each other, of a right-and-left screw connected with and arranged to equally and simultaneously adjust said saws toward and from a central perpendicular plane, a graduated scale, an index movable over said scale, a gear connected with said index and arranged to work with a tooth or projection on said screw, a stop normally restraining said gear from rotation, and a releasing device connected with said stop and arranged to be operated by the toothed projection on said screw, substantially as and for the purposes set forth.

18. In a stave-making machine the combination of a stationary curved clamp for holding a stave in the shape it is to have in a barrel, a reciprocating carriage movable back and forth on ways lengthwise of said clamp and parallel with the barrel-axis, a pair of jointing-saws mounted upon said carriage on opposite sides of said clamp and in planes which intersect each other in or parallel with the barrel-axis, mechanism for automatically feeding the carriage back and forth, driving-pulleys and idlers mounted on transverse shafts at or near opposite ends of the machine, pulleys on the saw-arbors, idlers on the saw-carriage below and on opposite sides of said pulleys, and belts passing around the pulleys at the ends of the machine, under the idlers on the saw-carriage and over the pulleys on the saw-arbors, substantially as and for the purposes set forth.

19. In a stave-making machine, the combination of a stationary clamp or work-holder for holding a stave in the shape it is to have in a barrel, a carriage movable lengthwise thereof and provided on opposite sides of said clamp or holder with jointing-saws having pulleys on their arbors and with idlers on opposite sides of and in line with said pulleys, said saws being set in planes intersecting each other in or parallel with the barrel-axis, and pulleys mounted on transverse shafts at or near the ends of the machine in line with the pulleys on said saw-carriage, the pulleys at one end of the machine being adjustable toward and from the pulleys at the opposite end, substantially as and for the purposes set forth.

20. In a stave-making machine, the combination of a stationary curved clamp or work-holder for holding a stave in the shape it is to have in a barrel, a reciprocating carriage movable lengthwise thereof, a pair of jointing-saws mounted on said carriage to pass on opposite sides of said clamp in planes intersecting each other in or parallel with the barrel-axis, idlers mounted on said carriage on opposite sides of and in line with pulleys on the saw-arbors, pulleys mounted at opposite ends of the machine in line with each other on transverse shafts, the pulleys at each end being on separate shafts and revoluble in opposite directions, adjustable boxes supporting said shafts at one end of the machine and connected adjusting-screws arranged to move each pair of boxes and the shaft supported thereon simultaneously toward or from the corresponding shaft at the other end of the machine, substantially as and for the purposes set forth.

21. In a stave-making machine, the combination of a curved stationary clamp or work-holder constructed and arranged to hold a stave immovably in the shape it is to have in a barrel, a reciprocating carriage movable lengthwise thereof and provided with transverse ways, saw-frames adjustable upon said transverse ways toward and from each other and provided in planes intersecting each other in or parallel with the barrel-axis with jointing-saws and with idlers on opposite sides of and in line with pulleys on the saw-arbors, and pulleys mounted at opposite ends of the machine on transverse shafts and connected by belts which pass alternately under and over the pulleys on said saw-frames, substantially as and for the purposes set forth.

22. In a stave-making machine, the combination with a clamp or holder, of a carriage movable lengthwise thereof and provided with a pair of jointing-saws, a pair of intermeshing gears, one of which has operating connections with said carriage, a rotary driving-shaft provided with a cam, and arms fixed upon the shafts of said gears and projecting alternately into the path of said cam, substantially as and for the purposes set forth.

23. In a stave-making machine, the combination with a clamp or holder, a reciprocating carriage movable lengthwise thereof and provided with a pair of jointing-saws, sprocket-wheels mounted on transverse shafts at opposite ends of the machine and connected by chain belts with said carriage, a pair of intermeshing gears, one of which is connected with one of the sprocket-wheel shafts, a rotary shaft provided with a cam, and arms fixed on the shafts of said gears and projecting alternately into the path of said cam, substantially as and for the purposes set forth.

24. In a stave-making machine, the combination with a stationary clamp or work-holder comprising a curved bed and presser-foot adapted to bend and hold a stave in the form it is to have in a barrel, of a carriage movable lengthwise thereof and provided with a pair of jointing-saws, a rotary shaft parallel with the barrel-axis movable toward and from said clamp or holder, and provided with cross-cutters, mechanism arranged to automatically advance and withdraw said shaft at intervals, and carriage feeding and reversing mechanism constructed and arranged to automatically move the jointing-saws forward and back at intervals alternating with the advance movements of the cross-cutters, substantially as and for the purposes set forth.

25. In a stave-making machine, the combination of a clamp or holder, a shaft supported in suitable bearings parallel with the barrel-axis and movable toward and from said clamp or holder, cutters fixed upon said shaft, a shield loosely mounted upon said shaft over said cutters and connected with the frame of the machine whereby the advance movement of the cutters causes them to project beyond said shield, substantially as and for the purposes set forth.

26. In a stave-making machine, the combination with a clamp or holder, of reciprocating saw-frames movable lengthwise of said clamp or holder on opposite sides thereof on ways parallel with the barrel-axis and adjustable toward and from each other, a pair of jointing-saws supported in said frames, and a laterally-movable bar parallel with said ways, having a sliding connection with one of the saw-frames and provided with a gage-stop arranged to determine the position transversely of a stave-blank in said clamp or holder, substantially as and for the purposes set forth.

27. In a stave-making machine, the combination with a forming-clamp comprising a fixed concave bed and a convex presser-foot, movable toward and from the same, of a swinging bar or frame movable toward and from said clamp, mechanism arranged to advance and withdraw said bar or frame at intervals, and a holder having a detachable connection with said bar or frame and constructed and arranged to be moved thereby into engagement with the ends of a stave held in said clamp and to remove the same from said clamp upon the withdrawal of said presser-foot, substantially as and for the purposes set forth.

28. In a stave-making machine, the combination with a forming-clamp, of a swinging bar or frame movable laterally toward and from said clamp and having its axis parallel with the barrel-axis, a cam-shaft provided with cams, having connections with and arranged to advance and withdraw said swinging bar or frame at intervals toward and from said clamp, and a holder having a detachable connection with said bar or frame and constructed and arranged when advanced thereby, to embrace the ends of a stave held in said clamp and to remove the same therefrom and retain it in its proper shape, substantially as and for the purposes set forth.

29. In a stave-making machine, the combination with a forming-clamp or holder, of an end-holder arranged to fit over and embrace the ends of a stave held in said clamp, and an end gage-stop arranged to determine the position longitudinally of a stave-blank in said clamp and movable laterally out of the way of said end-holder, substantially as and for the purposes set forth.

30. In a stave-making machine the combination of a forming and holding clamp consisting of a stationary concave bed and a convex presser-foot adapted to bend a stave and hold it in the form it is to have in a barrel, a rotary shaft parallel with the barrel-axis movable toward and from said clamp, a pair of trimming-saws and cutter-heads mounted on said shaft inside of said saws and provided with detachable chamfering, crozing and howeling cutters, a pair of jointing-cutters movable back and forth on opposite sides of said clamp parallel with the barrel-axis in planes intersecting each other in or near and parallel with the barrel-axis, said jointing-cutters operating upon the stave alternately with and after the operation of the trimming-saws and other cutters thereon, an end-clamp adapted to embrace the ends of a stave after it is trimmed to length by said saws and while it is held in the forming-clamp, and mechanism for automatically carrying an end-clamp, which is detachably connected with the machine, over the ends of a stave held in said forming-clamp after said saws and cutters have operated thereon, and for removing it therefrom when it is released by said forming-clamp, substantially as and for the purposes set forth.

In testimony that I claim the foregoing as my own I affix my signature in presence of two witnesses.

RICHARD BIRKHOLZ.

Witnesses:
CHAS. L. GOSS,
C. H. ATKINS.